United States Patent
Bittner (10) Patent No.: US 7,069,950 B1
(45) Date of Patent: Jul. 4, 2006

(54) NOISE ABATEMENT MODULE USING HERSCHEL-QUINCKE TUBES

(75) Inventor: Christopher Bittner, East Freetown, MA (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 11/094,698

(22) Filed: Mar. 30, 2005

(51) Int. Cl.
*F16K 47/04* (2006.01)
(52) U.S. Cl. .................................. 137/625.37; 138/42
(58) Field of Classification Search ............ 137/625.3, 137/625.33, 625.37; 138/42
See application file for complete search history.

(56) References Cited

U.S. PATENT DOCUMENTS

| | | | | |
|---|---|---|---|---|
| 4,267,045 | A | * | 5/1981 | Hoof .......................... 210/322 |
| RE32,197 | E | * | 7/1986 | Self ............................ 251/127 |
| 5,680,889 | A | | 10/1997 | Boger |
| 5,771,929 | A | | 6/1998 | Boger |
| 5,819,803 | A | | 10/1998 | Lebo et al. |
| 5,890,505 | A | | 4/1999 | Boger |
| 6,095,196 | A | * | 8/2000 | McCarty et al. .............. 138/42 |
| 6,112,514 | A | | 9/2000 | Burdisso et al. |
| 6,161,584 | A | * | 12/2000 | Hemme et al. ........ 137/625.37 |
| 6,244,297 | B1 | * | 6/2001 | Baumann ................. 137/625.3 |
| 6,701,957 | B1 | * | 3/2004 | McCarty et al. ......... 137/625.3 |
| 6,718,633 | B1 | * | 4/2004 | Glenn et al. ........... 29/890.124 |
| 6,807,986 | B1 | | 10/2004 | Boger |

OTHER PUBLICATIONS

Burdisso, Ricardo A. and Ng., Wing F., Fan Noise Control Using Herschel-Quincke Resonators, Jan. 2003, Virginia Polytechnic Institute and State University, Blacksburg, Virginia.

(Continued)

Primary Examiner—John Fox
(74) Attorney, Agent, or Firm—Fish & Richardson P.C.

(57) ABSTRACT

A noise-attenuating module of a valve trim, including: a first divider plate; a second divider plate; and a plurality of flow segment plates disposed adjacent to and in contact with one another. At least one Herschel-Quincke tube flow path is formed by interconnected openings in the flow segment plates.

A noise-attenuating cartridge to be placed transverse to the path of flowing fluid, the cartridge having: a plurality of flow segment plates disposed adjacent to and in contact with one another. At least one Herschel-Quincke tube is formed by interconnected openings in the flow segment plates.

A noise-attenuating cartridge to be placed transverse to the path of flowing fluid, the cartridge including a segmented disk disposed with a first surface in an upstream side of the path of the flowing fluid and a second surface disposed in a downstream side of the path of flowing fluid. The segmented disk having at least two lateral mating faces with at least one Herschel-Quincke tube milled into at least one of the lateral faces, said Herschel-Quincke tube open at an inlet end to the first surface of the segmented disk and open at a discharge end at the second surface of the segmented disk.

In the implementations disclosed herein, wherein at least a portion of fluid flowing in the fluid path flows into the first end of the Herschel-Quincke tube then divides into two flowstreams in the tube and then exits the Herschel-Quincke tube through an opening in the second end of the module, thereby reducing flow noise by diverting part of an acoustic wave created by the flowing fluid into the Herschel-Quincke tube, such that the acoustic wave of the Herschel-Quincke tube exits the tube out of phase with the main flow path acoustic wave, thus attenuating the main flow path noise.

31 Claims, 6 Drawing Sheets

OTHER PUBLICATIONS

Brady, Lori A., Application of the Herschel-Quincke Tube Concept to Higher-Order Acoustic Modes in Two-Dimensional Ducts, Mar. 1, 2002, Virginia Polytechnic Institute and State University.

Selamet, A. and Dickey, N.S., The Herschel-Quincke tube: A theoretical, computational, and experimental investigation, Nov. 1994, The Journal of the Acoustical Society of America.

* cited by examiner

NOISE ABATEMENT MODULE USING HERSCHEL-QUINCKE TUBES

TECHNICAL FIELD

This disclosure relates to an assembly for abating fluid noise using Herschel-Quincke tubes, and more particularly to a low noise valve trim and modular noise abatement insert.

BACKGROUND

In the transmission and distribution of pressurized gases and liquids, valves control a variable, such as pressure or flow rate, and operate at high pressure drops, that is, high pressure differentials between the upstream and downstream pressure. As such, in many instances these valves are fitted with actuators and positioners that respond to a control signal generated by a controller or computer. These valves are often referred to as "control valves."

When a high pressure gas or liquid ("fluid") is throttled through a control valve at a high pressure drop, aerodynamic noise is generated in the fluid and subsequently is propagated through the fluid, exiting the pipe walls (principally downstream), thereby causing noise to be propagated to the surrounding atmosphere. The result may be noise that exceeds allowable limits for worker hearing conservation.

A second concern involved with the throttling of a high pressure fluid through a control valve is that it often causes excessive mechanical vibration which results in attendant problems with the proper operation of associated measuring and controlling equipment. In addition, the vibration can also cause fatigue failure of welds or piping.

In order to reduce noise and mechanical vibration, inserts have been placed in the control valves. These inserts include a plurality of relatively small-diameter passages through which the fluid passes under certain flow conditions. Published U.S. Patent Application No. 2003-0178592 and U.S. Pat. No. 5,890,505 illustrate a noise reduction insert.

Control valves often are required for applications in which there is a high pressure drop throughout the entire range of travel of the valve. In these cases, the valves are designed for the continuous reduction of noise and mechanical vibration over their entire range of travel. U.S. Pat. No. 5,680,889 illustrates a valve of this type.

A prior art pressure reduction valve is manufactured by the assignee of the present application, Dresser, Inc., and sold under the trademark V-LOG. The V-LOG™ valve includes a trim having a plurality of flow resistance modules. U.S. Pat. No. 5,819,803, the disclosure of which is incorporated by reference, discloses a pressure reduction device that incorporates a plurality of flow resistance modules.

There are applications that involve a relatively high pressure drop at relatively low flow rates and small valve openings, and a relatively low pressure drop at maximum flow and relatively large valve openings. In the latter, low pressure-drop situation, a flow capacity is required that is higher than would be possible utilizing a valve designed for continuous noise reduction based on a high pressure drop throughout the entire valve travel range.

The valve of the present invention overcomes many limitations of prior art valves using the principle of "Herschel-Quincke tubes". The invention uses the Herschel-Quincke tube concept alone and/or combined with other passive noise reduction elements, and as single elements or arranged in arrays to reduce the noise generated by a control valve. The Herschel-Quincke (abbreviated "H-Q") tube is essentially a secondary flow path that branches off a main flow path and continues downstream for a certain length, L, recombining with the original main flow path (see FIGS. 1 and 2). The device reduces noise by diverting part of the acoustic wave traveling in the main flow path wave into the H-Q tube, the acoustic wave exits the tube out of phase with the main flow path acoustic wave, thus attenuating the main flow path noise.

Heretofore, Herschel-Quincke tubes have not been used in valve trim or as modular inserts in the fluid flow stream to attenuate noise generated by the valve. Burdisso et al. describes an invention using Herschel-Quincke tubes designed to reduce noise of the inlet and outlet ports of turbo-fan engines. (Burdisso, Ricardo and Ng, Wing, 2003, NASA/CR 2003-212097, Fan noise control using Herschel-Quincke Resonators). Ingard et al. describes a modified Herschel-Quincke tube designed to reduce duct noise. Ingard's device is fundamentally different from the present invention in that the device does not use a separate tube arrangement, but rather a flow splitter coupled with an expansion chamber to achieve the longer flow path described by Herschel and Quincke. (Brady, Lori, 2002 Masters Thesis Virginia Tech, Application of Herschel-Quincke tube Concept to Higher Order Acoustic Modes in Two-Dimensional Ducts).

SUMMARY

In one embodiment, a noise-attenuating module is disposed in a valve trim. The noise attenuating module includes: a first divider plate and a second divider plate having substantially the same perimeters. The module includes a first flow segment plate having substantially the same perimeter as the first and second divider plates. The first flow segment plate includes at least one opening from the first planar surface to a second planar surface of the first flow segment plate. A second flow segment plate having substantially the same perimeter as the first and second divider plates is disposed in the module with a first planar surface adjacent to the second planar surface of the first flow segment plate, said second flow segment plate having a first opening from the first planar surface of the second plate to a second planar surface of the second plate. The opening of the second flow segment plate is smaller (the actual size of the opening will vary based on required H-Q tube attenuation characteristics) in area than the opening in the first flow segment plate and the opening in the second flow segment plate positioned in fluid communication with the opening in the first flow segment plate. The second flow segment plate further includes at least one second opening from the first planar surface of the second plate to a second planar surface of the plate, said second opening being smaller in area than the opening in the first flow segment plate and positioned apart from and downstream from the first opening of the second flow segment plate and in fluid communication with the opening in the first flow segment plate. A third flow segment plate having substantially the same perimeter as the first and second divider plates is disposed with a first planar surface adjacent to a second planar surface of the second flow segment plate and having a second planar surface adjacent to the second divider plate, said third flow segment plate having a first opening from the first planar surface of the third plate to a second planar surface of the third plate, said opening being larger in area than either of the first or second openings in the second flow segment plate but smaller than the opening in the first flow segment plate, and said opening in the third flow segment plate positioned in fluid communication with both of the openings in the second flow segment plate. At least one Herschel-Quincke tube flow path is formed by the interconnected openings in the flow segment plates, wherein at least a portion of fluid flowing in the fluid path flows into the opening in the first flow segment plate, then into the first opening in the second flow segment plate, then into the opening in the third flow segment plate, then through the second opening in the second flow segment plate, then into the first opening in the first flow segment plate downstream of the first opening in the second flow segment plate.

The flow segment plates may be substantially toroidal and fluid may enter the module from a center portion of the toroid and exit from an outer edge of the toroid (or vice versa). In the embodiment depicted herein in FIGS. 5 and 6, fluid enters and exits from the same flow segment plate.

In another implementation, a pressure reducing device includes a valve trim comprising a plurality of noise attenuating modules as heretofore described, stacked one on top of another, said stack of noise attenuating modules being constructed and arranged to fit in a flow path within a pressure reducing device housing, each of said noise attenuating modules having at least three flow segment plates and two divider plates.

In another embodiment, a noise attenuating cartridge may be placed transverse to the path of flowing fluid. The cartridge includes a first cartridge segment plate disposed with a first planar surface in an upstream side of the path of the flowing fluid, said first cartridge segment plate having at least one opening from the first planar surface to a second planar surface of the first cartridge segment plate. A second cartridge segment plate is disposed with a first planar surface adjacent to the second planar surface of the first cartridge segment plate, said second cartridge segment plate has a first opening from the first planar surface of the second plate to a second planar surface of the second plate, said opening being larger in area than the opening in the first cartridge segment plate and said opening in the second cartridge segment plate positioned in fluid communication with the opening in the first cartridge segment plate. A third cartridge segment plate is disposed with a first planar surface adjacent to a second planar surface of the second flow cartridge plate, said third cartridge segment plate having a first and a second opening from the first planar surface of the third plate to a second planar surface of the third plate, said openings spaced apart from each other and positioned in fluid communication with the opening in the second cartridge segment plate. A fourth cartridge segment plate is disposed with a first planar surface adjacent to a second planar surface of the third cartridge segment plate, said third flow segment plate having a first opening from the first planar surface of the fourth plate to a second planar surface of the fourth plate, said opening being larger in area than either of the first or second openings in the third cartridge segment plate, and said opening in the fourth cartridge segment plate positioned in fluid communication with both of the openings in the third cartridge segment plate. A fifth cartridge segment plate is disposed with a first planar surface adjacent to the second planar surface of the fourth cartridge segment plate, said fifth cartridge segment plate having a first opening from the first planar surface of the fifth plate to a second planar surface of the fifth plate, said opening being smaller in area than the opening in the fourth cartridge segment plate and said opening in the fifth cartridge segment plate positioned in fluid communication with the opening in the first cartridge segment plate. At least one Herschel-Quincke tube flow path is formed by the interconnected openings in the cartridge segment plates, wherein at least a portion of fluid flowing in the fluid path flows into the opening in the first cartridge segment plate, then into the opening in the second cartridge segment plate, then divides into the openings in the third cartridge segment plate, then through the opening in the third cartridge segment plate, then into the opening in the fifth segment plate. It will be understood that multiple cartridge plates may be required to obtain the proper tube length. The cartridge segment plates may be substantially cylindrical and sized to be disposed in an outlet portion of a valve body or sized to be disposed in piping downstream of a pressure reducing device. In a modified implementation one or more additional cartridge segment plates may be installed on the upstream side of the noise attenuating cartridge and adjacent thereto. A plurality of openings smaller in area than the area of the openings of the first cartridge segment plate pass through the additional cartridge element plate. The openings in the additional cartridge element plate will be in fluid communication with the openings in the first cartridge element plate.

In another embodiment, a noise attenuating cartridge may comprise a segmented disk disposed with a first surface in an upstream side of the path of the flowing fluid and a second surface disposed in a downstream side of the path of flowing fluid. The segmented disk includes at least two lateral mating faces with at least one Herschel-Quincke tube flow path milled into at least one of the lateral faces, said Herschel-Quincke flow path opens at an inlet end to the first surface of the disk and opens at a discharge end at the second surface of the disk. At least a portion of fluid flowing in the fluid path flows into the first end of the Herschel-Quincke tube, then divides into two flowstreams in the tube and then exits the Herschel-Quincke tube through the opening in the second surface of the disk. The disk may be substantially cylindrical and sized to be disposed in an outlet portion of a valve body or sized to be disposed in piping downstream of a pressure reducing device.

The details of one or more implementations of the invention are set forth in the accompanying drawings and the description below. Other features, objects, and advantages of the invention will be apparent from the description and drawings, and from the claims.

DETAILED DESCRIPTION

Figure 1:
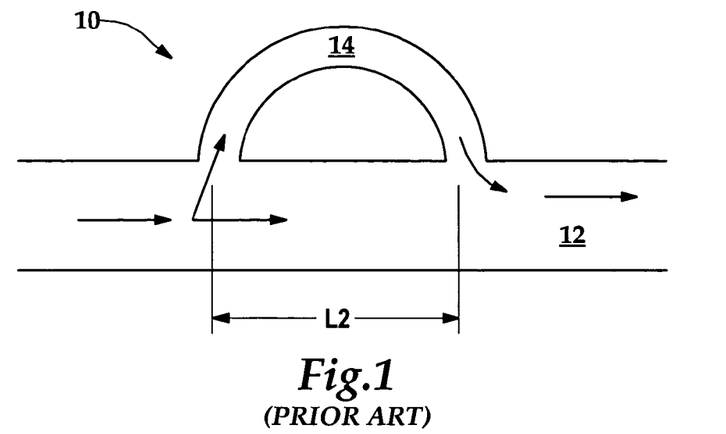
FIG. 1 is a flow schematic illustrating a simple prior art Herschel-Quincke tube.

An appreciation of the principles embodied in the present disclosure may be had by reference to the drawings wherein like items are numbered with like reference numerals. The present disclosure may be used with valves and piping systems containing pressurized liquids, pressurized gases or combinations thereof. Hereinafter, the term "fluid" is used to refer to a gas, liquid or mixture thereof. Referring now to FIG. 1, there is illustrated a prior art Herschel-Quincke tube 10 that includes a primary flow path 12 and a secondary flow path 14. The secondary flow path 14 branches off the main flow path 12 and continues downstream for a certain length $L_1$ and then combines with the original main flow path 12. The device reduces noise by diverting part of the acoustic wave traveling the length $L_2$ in the main flow path 12 into the side branch flow path 14. The branched acoustic wave remains acoustically out of phase with the main flow path, thus attenuating the main flow path noise. The frequency attenuated is dependent upon lengths $L_1$, $L_2$ and area A.

Figure 2:
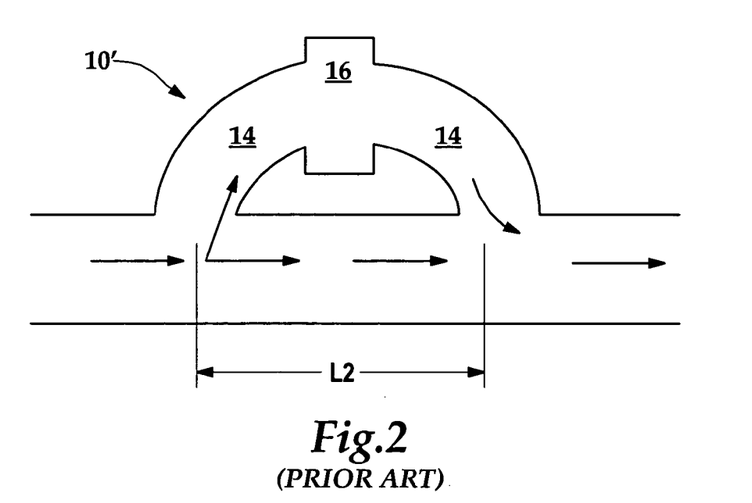
FIG. 2 illustrates a prior art Herschel-Quincke tube with an expansion chamber combined with the bypass tube of the Herschel-Quincke tube.

The Herschel-Quincke tube concept for noise attenuation may be implemented with other passive noise control elements such as expansion chambers, Helmholtz resonators and tortuous path valve trims. An example of use of an expansion chamber in connection with the Herschel-Quincke tube concept is illustrated in FIG. 2 wherein expansion chamber 16 is included in the secondary flow path 14. Use of the expansion chamber 16 can reduce the required length $L_2$ of the secondary flow path 14 of the Herschel-Quincke tube 10.

One embodiment of the invention uses a Herschel-Quincke tube placed within a valve trim either alone or as supplemental noise control devices. It will be understood that the valve trim of the present invention may be used with control valves having actuators, manually operated throttling valves and other valves and pressure control devices suitable for high pressure drop services.

Figure 3:
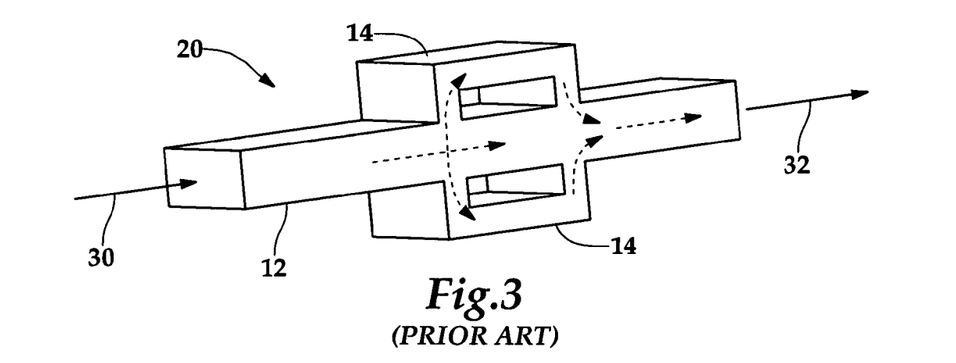
FIG. 3 is a three-dimensional Herschel-Quincke tube flow path.

Referring now to FIG. 3, there is illustrated a three-dimensional Herschel-Quincke tube flow path 20 which includes a main flow path 12 and branch flow path 14 branching off on either side of main flow path 12. It will be understood by those skilled in the art that there may be a single secondary branch 14 or may include dual secondary branches 14 as illustrated in FIG. 3.

Figure 4:
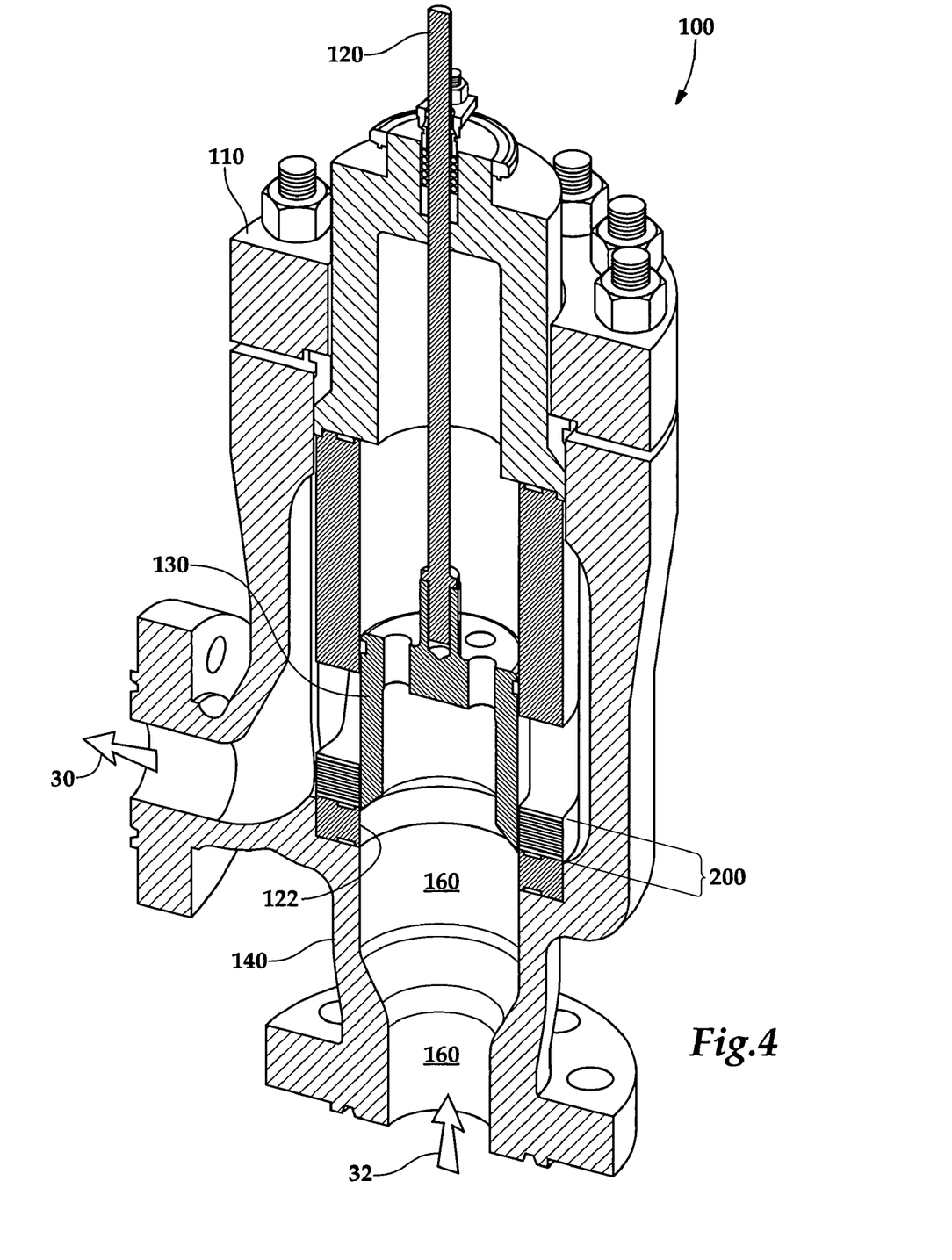
FIG. 4 is a perspective cutaway of a control valve assembly incorporating a valve trim with Herschel-Quincke tubes.

Referring now to FIG. 4 there is illustrated a cutaway perspective view of a three-dimensional control valve assembly 100 incorporating Herschel-Quincke tubes in the valve trim. The valve 100 includes bonnet assembly 110, a stem 120, plug assembly 130, and a body 140. Plug 130 contacts low noise valve trim 200 which includes Herschel-Quincke tubes in combination with prior art tortuous path low noise trim. Tortuous flow path noise abatement is known in the art and described in U.S. Pat. No. 5,819,803, incorporated by reference herein.

Figure 5:
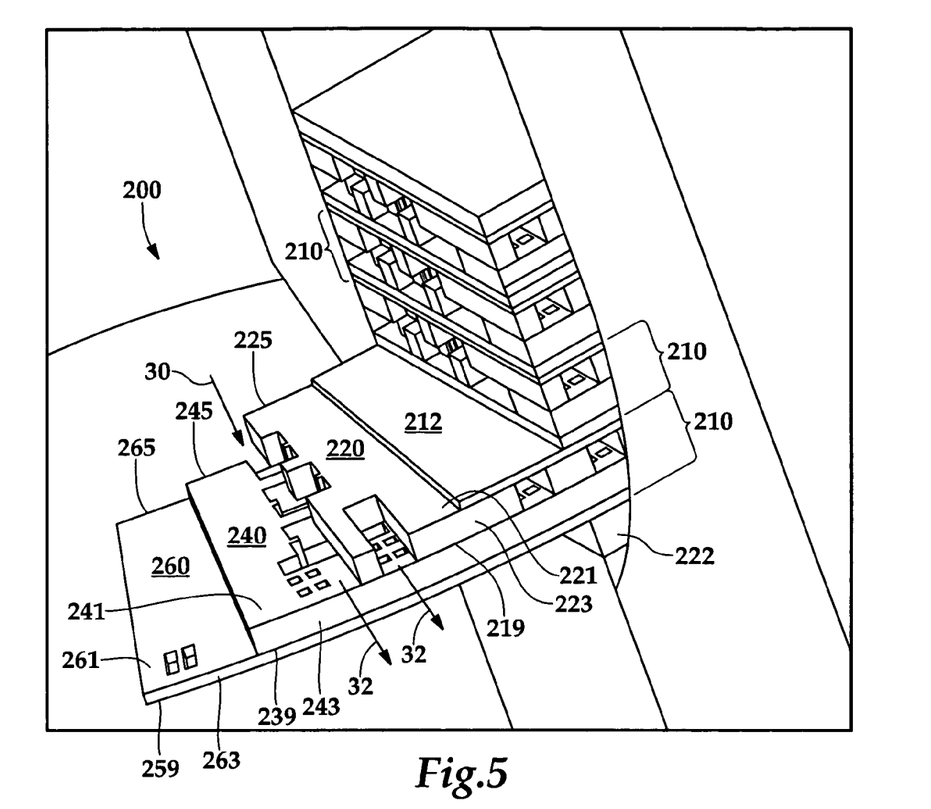
FIG. 5 is an enlarged partial perspective of the trim of the valve of FIG. 4 illustrating the flow segment plates comprising the trim.

Referring now to FIG. 5 is an enlarged partial perspective of a section of valve 100 illustrating low noise valve trim 200. As can be seen in FIGS. 4 and 5, fluid 30 flows into valve 100 when plug 120 is raised off of seat 122. Fluid 30 flows into the valve trim 200. Valve trim 200 is comprised of a plurality of different flow modules 210.

FIG. 5 illustrates one of the flow modules 210 in an expanded cutaway view. The flow module 210 includes a divider plate 212 disposed between the individual flow modules. In addition to divider plate 212 the flow resistance module includes three flow segment plates 220, 240 and 260. The flow segment plates are formed in a toroidal shape. Specifically, the plates are of substantially circular planes with a hole formed in the middle. First flow segment plate 220 is described by an upper surface 219, a lower surface 221, an outer edge 223 and an inner edge 225. Similarly, the second flow segment plate 240 is defined by lower surface 239, upper surface 249, an outer edge 243 and an inner edge 245. Similarly, the third flow segment plate 260 is defined by a lower surface 259, an upper surface 261, an outer edge 263, and an inner edge 265. As may be seen in FIG. 5, each of the flow segment plates 220, 240 and 260 includes a plurality of openings completely through the plates. These openings terminate at the upper and lower surfaces of the flow segment plates 220, 240 and 260.

Figure 6:
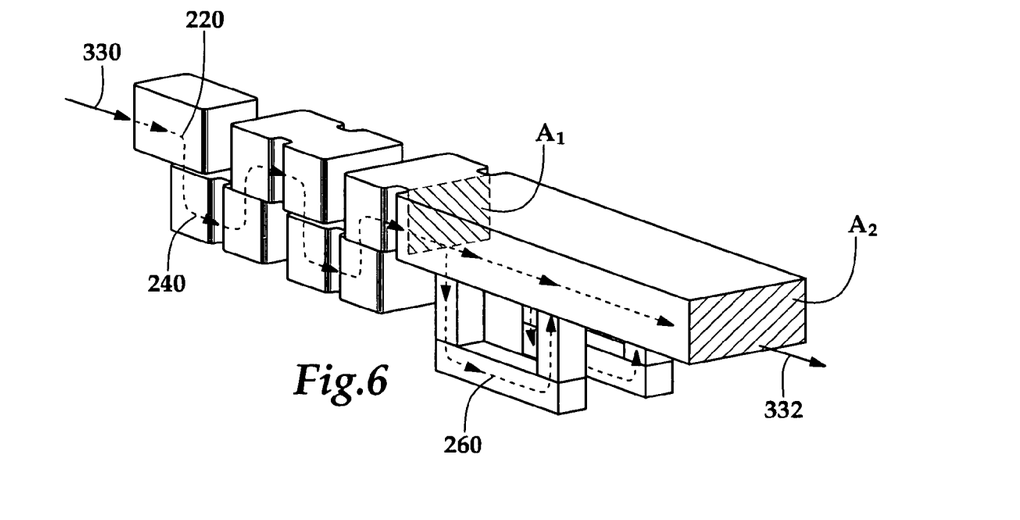
FIG. 6 is a reverse positive image of a fluid flow path of a module of the trim of FIG. 5.

Referring now to FIG. 6 wherein is illustrated a reverse positive image of a flow path corresponding to the openings in plates 220, 240 and 260. Flow stream 330 enters the flow path at the first opening in first flow segment plate 220. The flow makes a right angle turn into the opening in plate 240, flows along the first opening in plate 240, makes a right angle turn, passes through the second opening in plate 220, makes a right angle turn and flows along the second opening in plate 220, makes a right angle turn and passes back down into another opening in plate 240, flows along the opening in plate 240, makes a right angle turn and comes back up into plate 220 where it makes a right angle turn and flows into a longer radially outward opening in plate 220. The flow then enters the Herschel-Quincke tube portion of the valve trim 200. A portion of the flow is diverted through (one or more) openings in plate 240 downward into one or more outward radial openings in plate 260. The number of radial openings and size of the openings will depend on the properties of the fluid flowing and the pressure drop across the flow module. The portion of the flow passes along the opening of plate 260, makes a right angle turn to flow through an opening in plate 240 to merge with the main flow stream and exits the flow module as flow stream 332. The cross-sectional area $A_1$ of the inlet to the Herschel-Quincke portion 227 of the flow path may be reduced or enlarged to affect the noise attenuation effect of the noise reduction of the flow path noise. The cross-sectional area $A_2$ may be increased to increase the effectiveness of the Herschel-Quincke tube's noise reduction of flow path noise.

It will be understood that the terms "down" and "back up" and the like are for convenience of explanation of the flow path as illustrated in FIGS. 5 and 6. However, such terms are not meant to be limiting as the Herschel-Quincke flow path may be oriented other than up or down as defined by gravitational force. The force of the pressurized fluid is sufficient to move the fluid through a Herschel-Quincke tube in any orientation.

One improvement of this embodiment of the present invention is characterized by the addition of the Herschel-Quincke tube flow path in the flow module 210 formed by openings in plates 220, 240 and 260. It is necessary to place the first, second and third flow segment plates 220, 240 and 260 adjacent to a solid surface to seal off the individual flow segments to prevent commingling of the flow stream with the flow stream of other adjacent flow modules 210 until the fluid has exited the module. As shown in FIG. 5, the first flow plate 240 is adjacent to a first divider plate 212 and the third flow plate 260 is adjacent to a second divider plate 222. In the valve trim 200, divider plates 212 and 222 may be toroidal plates. As will be understood by those skilled in the art, it is also possible to delete one or more divider plates 212 and 222 by using solid portions of adjacent first and third segment plates 220 and 260. By angularly orienting each module 210 comprising the first, second and third flow segment plates 220, 240 and 260 with the flow segment plates of adjacent modules 210, it is possible to accomplish the same flow path isolation as provided by the first and second divider plates.

Figure 7:
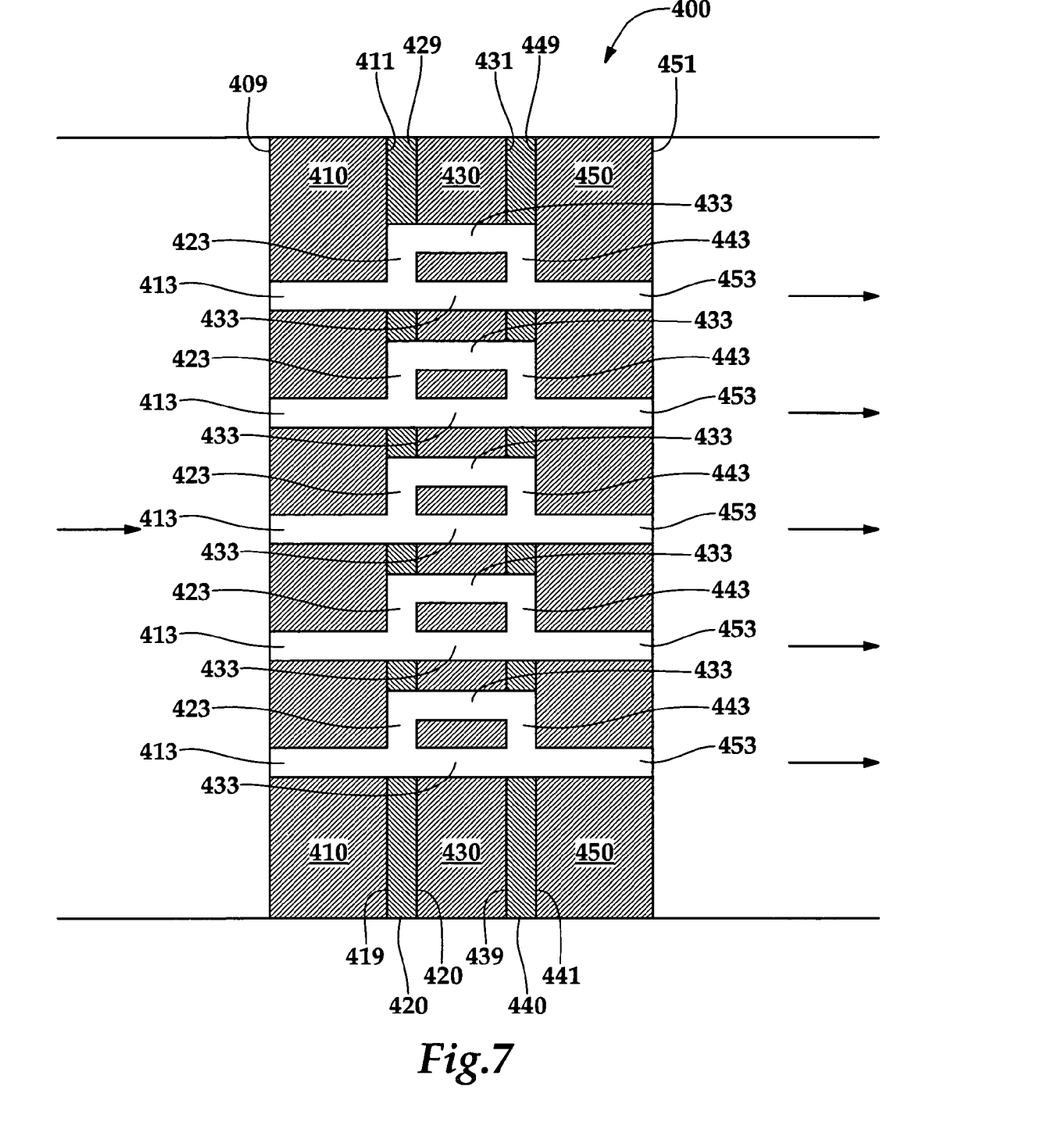
FIG. 7 is a cross-section of a noise attenuating cartridge including a Herschel-Quincke tube formed by the interconnected openings in the cartridge segment plates.

Referring now to FIG. 7 is a cross section of a noise attenuating cartridge 400 incorporating Herschel-Quincke tubes. Cartridge 400 may be installed in an outlet 160 in the body 140 of control valve 100 or may be installed in piping 490 downstream of a control valve (FIG. 7). Fluid 430 flows through cartridge 400 and exits in noise attenuate fluid paths 432. Cartridge 400 may be comprised of a plurality of cartridge segment plates 410, 420, 430, 440, and 450. Specifically, the plates are substantially circular planes with a plurality of holes therethrough wherein the plates are assembled adjacent to each other in a manner to form a plurality of Herschel-Quincke flow tubes.

First cartridge segment plate 410 is defined by a first surface 409, a second parallel surface 411 and a plurality of openings 413 completely through the plate 410 terminating at surface 409 and surface 411. Similarly, the second cartridge segment plate 420 is defined by first surface 419 and a second parallel surface 421. Plate 420 has a plurality of openings 423 completely through the plate from surface 419 to surface 421. Each opening 423 is positioned in fluid communication with opening 413. Similarly, third cartridge segment plate 430 is defined by a first surface 429, a second parallel surface 431 and a plurality of openings 433 completely through the plate 430 terminating at surface 429 and surface 431. Each opening 433 is positioned in fluid communication with opening 423. Similarly, the fourth cartridge segment plate 440 is defined by first surface 439 and a second parallel surface 441. Plate 440 has a plurality of openings 443 completely through the plate from surface 439 to surface 441. Each opening 443 is positioned in fluid communication with opening 433. Likewise, the fifth cartridge segment plate 450 is defined by first surface 449 and a second parallel surface 451. Plate 450 has a plurality of openings 453 therethrough from surface 449 to surface 451. Each opening 453 is positioned in fluid communication with opening 443. Fluid exits openings 453 as multiple flow paths 432, wherein the noise in the fluid generated by throttling in the flow control device has been attenuated by the Hershel-Quincke tubes formed by the series of connecting openings 413, 423, 433, 443 and 453.

Figure 8:
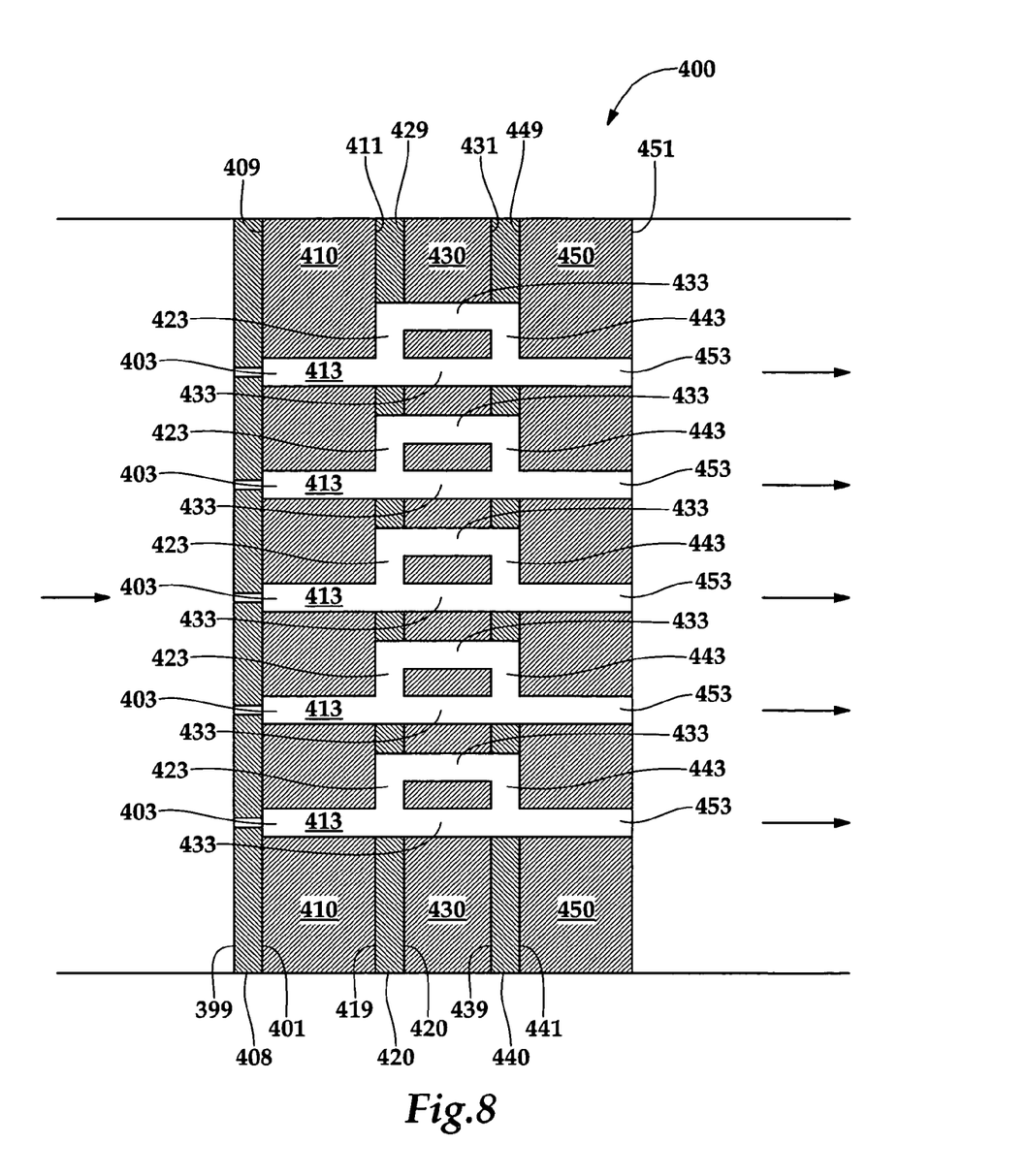
FIG. 8 is a cross-section of another implementation of the noise attenuating cartridge of FIG. 7 including an additional plate installed on the upstream side of the cartridge.

Referring now to FIG. 8 therein is disclosed another implementation of the noise attenuating cartridge 400 of FIG. 7 including one or more additional plates 408 installed on the upstream side of the cartridge 400. A plate 408 is placed upstream and adjacent to first cartridge segment plate 410. Plate 408 is defined by a first surface 399, a second parallel surface 401, disposed adjacent surface 409 of plate 410, and a plurality of openings 403 completely through the plate 408 terminating at surface 399 and surface 401. Openings 403 are adjacent to and in fluid communication with respective adjacent openings 413 of plate 410. Fluid exits openings 453 of noise attenuating cartridge 400 as multiple flow paths 432, wherein the noise in the fluid generated by throttling in the flow control device has been attenuated by the Hershel-Quincke tubes formed by the series of respective connecting openings 403, 413, 423, 433, 443 and 453.

Figure 9:
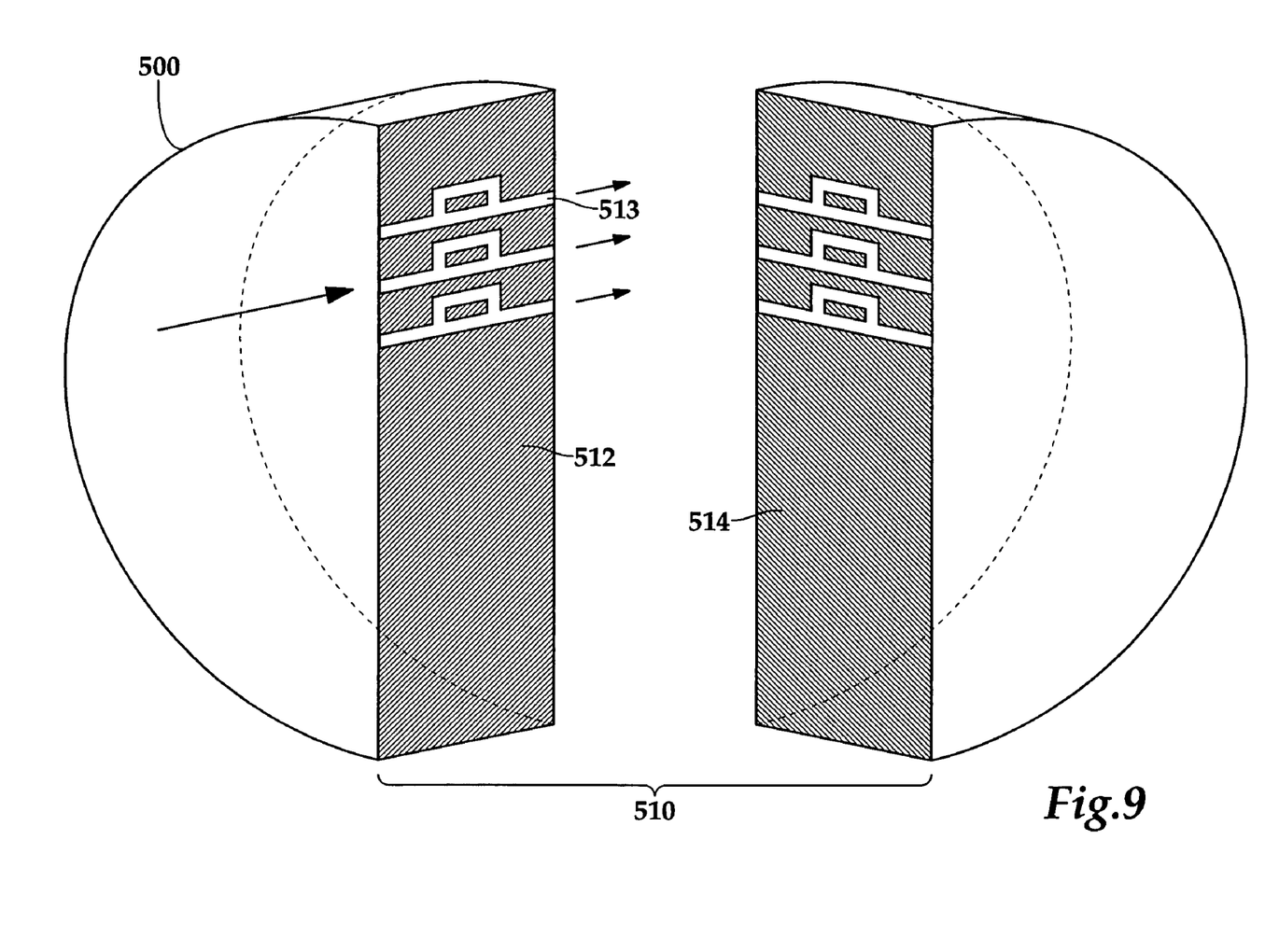
FIG. 9 is a perspective of two halves of yet another implementation of a cartridge flow element including a Herschel-Quincke tube.

Referring now to FIG. 9, it will also be understood that a cartridge flow element 500 may be formed by cutting a single cartridge plate 510 radially in half and then milling a Herschel-Quincke flow path 513 into the interior edge half plate 512. Similarly, Herschel-Quincke flow plate 513 may be milled into the interior edge of half plate 514 and then the half plates 512 and 514 assembled such that the Herschel-Quincke flow paths 513 mate to form a corresponding Herschel-Quincke flow path in the mating half. Alternatively, either the plate 512 or 514 may have the Herschel-Quincke flow paths milled in the interior edges therein (but not both) and then a blank edge of the half disk assembled thereto. In a like manner, the plate 510 may be cut into quarters or more sections and have Herschel-Quincke tubes milled in the cut edges therein and reassembled to form cartridge flow element 500.

There may be additional modifications and embodiments of the present invention without departing from the scope of the present invention and such modifications and additional embodiments are intended to be within the scope of the appended claims.

What is claimed is:

1. A noise-attenuating module of a valve trim, wherein the noise attenuating module includes:
    a first divider plate;
    a second divider plate;
    and a plurality of flow segment plates disposed adjacent to and in contact with one another;
    at least one Herschel-Quincke tube formed by interconnected openings in the flow segment plates,
    wherein at least a portion of fluid flowing in the fluid path flows into a first end of the Herschel-Quincke tube then divides into two flowstreams in the tube and then exits the Herschel-Quincke tube through an opening in a second end of the module, thereby reducing flow noise by diverting part of an acoustic wave created by the flowing fluid into the Herschel-Quincke tube, such that the acoustic wave of the Herschel-Quincke tube exits the tube out of phase with the main flow path acoustic wave, thus attenuating the main flow path noise.

2. A noise-attenuating module of a valve trim, said noise attenuating module comprising:
    a first divider plate;
    a second divider plate;
    a first flow segment plate disposed with a first planar surface adjacent to the first divider plate, said first flow segment plate having at least one opening from the first planar surface to a second planar surface of the first flow segment plate;
    a second flow segment plate disposed with a first planar surface adjacent to the second planar surface of the first flow segment plate, said second flow segment plate having a first opening from the first planar surface of the second plate to a second planar surface of the second plate, said opening being smaller in area than the opening in the first flow segment plate and said opening in the second flow segment plate positioned in fluid communication with the opening in the first flow segment plate, said second flow segment plate having a second opening from the first planar surface of the second plate to a second planar surface of the plate, said second opening being smaller in area than the opening in the first flow segment plate and positioned apart from and downstream from the first opening of the second flow segment plate and in fluid communication with the opening in the first flow segment plate;
    a third flow segment disposed with a first planar surface adjacent to a second planar surface of the second flow segment plate and having a second planar surface adjacent to the second divider plate, said third flow segment plate having a first opening from the first planar surface of the third plate to a second planar surface of the third plate, said opening being larger in area than either of the first or second openings in the second flow segment plate, and said opening in the third flow segment plate positioned in fluid communication with both of the openings in the second flow segment plate;

at least one Herschel-Quincke tube formed by the interconnected openings in said flow segment plates, wherein at least a portion of fluid flowing in the fluid path flows into the opening in the first flow segment plate, then into the first opening in the second flow segment plate, then into the opening in the third flow segment plate, then through the second opening in the second flow segment plate, then into the first opening in the first flow segment plate downstream of the first opening in the second flow segment plate.

3. The noise-attenuating module of claim 1 wherein said plates are substantially toroidal.

4. The noise-attenuating module of claim 3 wherein fluid enters the module from a center portion of the toroid and exits from an outer edge of the toroid.

5. The noise-attenuating module of claim 1 wherein fluid enters and exits from the same flow segment plate.

6. The noise-attenuating module of claim 3 wherein the perimeter of central opening is the same perimeter in all the toroidal plates.

7. The noise-attenuating module of claim 1 wherein the flow segment plates have substantially the same outer perimeter.

8. The noise-attenuating module of claim 1 wherein a cross-sectional area of an exit portion of the Herschel-Quincke tubes is increased and thereby increases the attenuation of the main flow path noise.

9. The noise-attenuating module of claim 1 having at least three noise attenuating modules stacked one on top of another, wherein the first and second divider plates are formed from those portions which do not include openings formed therethrough in an adjacent upper or lower surface of said first and third flow segment plates of an adjacent module.

10. A pressure reducing device comprising:
a plurality of noise-attenuating modules stacked adjacent to and in contact with one another,
said stack of noise-attenuating modules being constructed and arranged to fit in a flow path within a pressure reducing device body, each of said noise attenuating modules having:
a first divider plate;
a second divider plate;
and a plurality of flow segment plates disposed adjacent to and in contact with one another;
at least one Herschel-Quincke tube formed by interconnected openings in the flow segment plates,
wherein at least a portion of fluid flowing in the fluid path flows into a first end of the Herschel-Quincke tube then divides into two flowstreams in the tube and then exits the Herschel-Quincke tube through an opening in a second end of the module, thereby reducing flow noise by diverting part of an acoustic wave created by the flowing fluid into the Herschel-Quincke tube, such that the acoustic wave of the Herschel-Quincke tube exits the tube out of phase with the main flow path acoustic wave, thus attenuating the main flow path noise.

11. A pressure reducing device comprising:
a plurality of noise-attenuating modules stacked adjacent to and in contact with one another,
said stack of noise-attenuating modules being constructed and arranged to fit in a flow path within a pressure reducing device body, each of said noise attenuating modules having:

a first divider plate;
a second divider plate;
a first flow segment plate, said first flow segment plate disposed with a first planar surface adjacent to the first divider plate, said first flow segment plate having at least one opening from the first planar surface to a second planar surface of the first flow segment plate;
a second flow segment plate, said second flow segment plate disposed with a first planar surface adjacent to the second planar surface of the first flow segment plate, said second flow segment plate having a first opening from the first planar surface of the second plate to a second planar surface of the second plate, said opening being smaller in area than the opening in the first flow segment plate and said opening in the second flow segment plate positioned in fluid communication with the opening in the first flow segment plate, said second flow segment having a second opening from the first planar surface of the second flow segment plate to a second planar surface of the plate, said second opening being smaller in area than the opening in the first flow segment plate and positioned apart from and downstream from the first opening of the second flow segment plate and in fluid communication with the opening in the first flow segment plate;
a third flow segment plate, said third flow segment plate disposed with a first planar surface adjacent to a second planar surface of the second flow segment plate and having a second planar surface adjacent to the second divider plate, said third flow segment plate having a first opening from the first planar surface of the third plate to a second planar surface of the third plate, said opening being larger in area than either of the first or second openings in the second flow segment plate and said opening in the third flow segment plate positioned in fluid communication with both of the openings in the second flow segment plate;
at least one Herschel-Quincke tube flow path formed by the interconnected openings in said flow segment plates, wherein at least a portion of fluid flowing in the fluid path flows into the opening in the first flow segment plate, then into the first opening in the second flow segment plate, then into the opening in the third flow segment plate, then through the second opening in the second flow segment plate, then into the first opening in the first flow segment plate downstream of the first opening in the second flow segment plate.

12. The noise-attenuating module of claim 10 wherein said plates are substantially toroidal.

13. The noise-attenuating module of claim 12 wherein fluid enters the module from a center portion of the toroid and exits from an outer edge of the toroid.

14. The noise-attenuating module of claim 10 wherein fluid enters and exits from the same flow segment plate.

15. The noise-attenuating module of claim 10 wherein fluid enters the module in a flow segment plate and exits from the module from an adjacent flow segment plate.

16. The noise-attenuating module of claim 12 wherein the perimeter of central opening is the same perimeter in all the toroidal plates.

17. The noise-attenuating module of claim 10 wherein the first and second divider plates are formed from those portions of the adjacent surfaces of said first and third flow segment plates which do not include openings formed therethrough.

18. The noise attenuating module of claim 10 wherein at least one of the divider plates includes an opening therethrough and fluid enters a first noise attenuating module and exits through a second noise attenuating module.

19. The noise attenuating module of claim 18 wherein fluid enters a first noise attenuating module and exits through at least two flow attenuating modules.

20. The noise attenuating module of claim 10 wherein at least one of the divider plates includes an opening therethrough and fluid enters at least two noise attenuating modules and exits through only one noise attenuating module.

21. The noise-attenuating module of claim 10 wherein a cross-sectional area of an exit portion of the Herschel-Quincke tubes is increased and thereby increases the attenuation of the main flow path noise.

22. A noise-attenuating cartridge to be placed transverse to the path of flowing fluid, the cartridge having:
   a plurality of flow segment plates disposed adjacent to and in contact with one another;
   at least one Herschel-Quincke tube formed by interconnected openings in the flow segment plates,
   wherein at least a portion of fluid flowing in the fluid path flows into a first end of the Herschel-Quincke tube then divides into two flowstreams in the tube and then exits the Herschel-Quincke tube through an opening in a second end of the cartridge, thereby reducing flow noise by diverting part of an acoustic wave created by the flowing fluid into the Herschel-Quincke tube, such that the acoustic wave of the Herschel-Quincke tube exits the tube out of phase with the main flow path acoustic wave, thus attenuating the main flow path noise.

23. A noise-attenuating cartridge to be placed transverse to the path of flowing fluid, said cartridge having:
   a first cartridge segment plate, said first cartridge segment plate disposed with a first planar surface in an upstream side of the path of the flowing fluid, said first cartridge segment plate having at least one opening from the first planar surface to a second planar surface of the first cartridge segment plate;
   a second cartridge segment plate disposed with a first planar surface adjacent to the second planar surface of the first cartridge segment plate, said second cartridge segment plate having a first opening from the first planar surface of the second plate to a second planar surface of the second plate, said opening being larger in area than the opening in the first cartridge segment plate and said opening in the second cartridge segment plate positioned in fluid communication with the opening in the first cartridge segment plate;
   a third cartridge segment plate disposed with a first planar surface adjacent to a second planar surface of the second flow cartridge plate, said third cartridge segment plate having a first and a second opening from the first planar surface of the third plate to a second planar surface of the third plate, said openings spaced apart from each other and positioned in fluid communication with the opening in the second cartridge segment plate;
   a fourth cartridge segment plate disposed with a first planar surface adjacent to a second planar surface of the third cartridge segment plate, said fourth cartridge segment plate having a first opening from the first planar surface of the fourth plate to a second planar surface of the fourth plate, said opening being larger in area than either of the first or second openings in the third cartridge segment plate, and said opening in the fourth cartridge segment plate positioned in fluid communication with both of the openings in the third cartridge segment plate;
   a fifth cartridge segment plate disposed with a first planar surface adjacent to the second planar surface of the fourth cartridge segment plate, said fifth cartridge segment plate having a first opening from the first planar surface of the fifth plate to a second planar surface of the fifth plate, said opening being smaller in area than the opening in the fourth cartridge segment plate and said opening in the fifth cartridge segment plate positioned in fluid communication with the opening in the first cartridge segment plate;
   at least one Herschel-Quincke tube flow path formed by the interconnected openings in said cartridge segment plates, wherein at least a portion of fluid flowing in the fluid path flows into the opening in the first cartridge segment plate, then into the opening in the second cartridge segment plate, then divides into the openings in the third cartridge segment plate, then the divided flow combines in the opening in the fourth cartridge segment plate and then flows into the opening in the fifth segment plate and exits the noise-attenuating cartridge.

24. The noise-attenuating cartridge of claim 22 wherein said plates are substantially cylindrical and sized to be disposed in an outlet portion of a valve body.

25. The noise-attenuating cartridge of claim 22 wherein said plates are substantially cylindrical and sized to be disposed in piping downstream of a pressure reducing device.

26. The noise-attenuating cartridge of claim 22 further including:
   one or more additional cartridge segment plates disposed on the upstream side of the noise attenuating cartridge and adjacent thereto,
   said additional cartridge segment plate having a plurality of openings smaller in area than the area of the openings of the first cartridge segment plate, said smaller openings pass through the additional cartridge element plate and being in fluid communication with the openings in the first cartridge element plate.

27. The noise-attenuating module of claim 22 wherein a cross-sectional area of an exit portion of the Herschel-Quincke tubes is increased and thereby increases the attenuation of the main flow path noise.

28. A noise-attenuating cartridge to be placed transverse to the path of flowing fluid, said cartridge comprising:
   a segmented disk disposed with a first surface in an upstream side of the path of the flowing fluid and a second surface disposed in a downstream side of the path of flowing fluid,
   said segmented disk having at least two lateral mating faces with at least one Herschel-Quincke tube milled into at least one of the lateral faces, said Herschel-Quincke tube open at an inlet end to the first surface of the segmented disk and open at a discharge end at the second surface of the segmented disk,
   wherein at least a portion of fluid flowing in the fluid path flows into the first end of the Herschel-Quincke tube then divides into two flowstreams in the tube and then exits the Herschel-Quincke tube through the opening in the second surface of the disk.

29. The noise-attenuating cartridge of claim 28 wherein said disk is substantially cylindrical and sized to be disposed in an outlet portion of a valve body.

30. The noise-attenuating cartridge of claim 28 wherein said disk is substantially cylindrical and sized to be disposed in piping downstream of a pressure reducing device.

31. The noise-attenuating module of claim 28 wherein a cross-sectional area of an exit portion of the Herschel-Quincke tubes is increased and thereby increases the attenuation of the main flow path noise.

* * * * *

UNITED STATES PATENT AND TRADEMARK OFFICE
CERTIFICATE OF CORRECTION

| | |
|---|---|
| PATENT NO. | : 7,069,950 B1 |
| APPLICATION NO. | : 11/094698 |
| DATED | : July 4, 2006 |
| INVENTOR(S) | : Christopher Bittner |

It is certified that error appears in the above-identified patent and that said Letters Patent is hereby corrected as shown below:

Column 8, line 62, claim 2, insert --plate-- after "segment" and before "disposed"

Column 9, line 17, claim 3, insert --flow segment-- before "plates"

Column 9, line 19, claim 4, delete "toroid" and insert --toroidal shaped flow segment plates-- therefor Column 9, line 20, claim 4, delete "toroid" and insert --toroidal shaped flow segment plates-- therefor Column 10, line 46, claim 12, delete "noise-attenuating module" and insert --pressure reducing device-- therefor Column 10, line 47, claim 12, insert --flow segment-- after "said" and before "plates"

Column 10, line 48, claim 13, delete "noise-attenuating module" and insert --pressure reducing device-- therefor Column 10, line 49, claim 13, delete "toroid" and insert --toroidal shaped flow segment plates-- therefor Column 10, line 50, claim 13, delete "toroid" and insert --toroidal shaped flow segment plates-- therefor Column 10, line 51, claim 14, delete "noise-attenuating module" and insert --pressure reducing device-- therefor Column 10, line 53, claim 15, delete "noise-attenuating module" and insert --pressure reducing device-- therefor Signed and Sealed this
Twenty-second Day of February, 2011

David J. Kappos
*Director of the United States Patent and Trademark Office*

CERTIFICATE OF CORRECTION (continued)
U.S. Pat. No. 7,069,950 B1

Column 10, line 56, claim 16, delete "noise-attenuating module" and insert --pressure reducing device-- therefor Column 10, line 59, claim 17, delete "noise-attenuating module" and insert --pressure reducing device-- therefor Column 10, line 64, claim 18, delete "noise-attenuating module" and insert --pressure reducing device-- therefor Column 11, line 1, claim 19, delete "noise-attenuating module" and insert --pressure reducing device-- therefor Column 11, line 4, claim 20, delete "noise-attenuating module" and insert --pressure reducing device-- therefor Column 11, line 9, claim 21, delete "noise-attenuating module" and insert --pressure reducing device-- therefor Column 11, line 17, claim 22, insert --plurality of-- after "the" and before "flow"

Column 12, line 19, claim 24, insert --flow segment-- after "said" and before "plates"

Column 12, line 22, claim 25, insert --flow segment-- after "said" and before "plates"

Column 12, line 27, claim 26, insert --flow-- after "cartridge" and before "segment"

Column 12, line 30, claim 26, insert --flow-- after "cartridge" and before "segment"

Column 12, line 33, claim 26, insert --of the additional cartridge plate-- after "openings" and before "pass"

Column 12, line 35, claim 27, delete "module" and insert --cartridge-- therefor

Column 12, line 40, claim 28, delete "to the path" and insert --to a path-- therefor Column 12, line 42, claim 28, delete "the path of the flowing fluid" and insert --a path of a flowing fluid-- therefor Column 12, line 43, claim 28, delete "downstream side of the" and insert --downstream side of a-- therefor Column 12, line 61, claim 31, delete "module" and insert --cartridge-- therefor